(12) United States Patent
Hoang

(10) Patent No.: US 6,266,099 B1
(45) Date of Patent: Jul. 24, 2001

(54) VIDEO ON-SCREEN DISPLAY WITH REDUCED FEEDTHROUGH AND CROSSTALK

(75) Inventor: Tuong Hai Hoang, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/129,138

(22) Filed: Aug. 4, 1998

(51) Int. Cl.$^7$ .............................. H04N 5/50; H04N 5/14
(52) U.S. Cl. ............................................ 348/569; 348/707
(58) Field of Search ...................................... 348/569, 707, 348/570, 563, 725; 330/284; H04N 5/50, 5/14, 5/445

(56) References Cited

U.S. PATENT DOCUMENTS 4,795,949 * 1/1989 Wilber ................................. 315/397

FOREIGN PATENT DOCUMENTS 11-103398 * 4/1999 (JP).
11-272255 * 10/1999 (JP).

* cited by examiner

Primary Examiner—Sherrie Hsia
(74) Attorney, Agent, or Firm—Skjerven Morrill MacPherson LLP; Edward C. Kwok, Esq.

(57) ABSTRACT

A video pre-amplifier includes an input stage and an output stage. In one embodiment, an on-screen display signal is provided to the output stage, and a control signal is asserted when the on-screen display signal is active. With respect to a video output signal, both the gains of the input stage and output stage are adjusted when the control signal is asserted. In one embodiment, the control signal is generated by a comparator within the output stage.

14 Claims, 2 Drawing Sheets

VIDEO ON-SCREEN DISPLAY WITH REDUCED FEEDTHROUGH AND CROSSTALK

BACKGROUND OF THE INVENTION

1. Field of the Invention

The present invention relates to an amplifier circuit for video display. In particular, the present invention relates to an amplifier circuit for providing on screen a signal for a second image overlaying the video image.

2. Background of the Invention

On-screen Display (OSD) is a technique by which a signal for a second image is substituted for a video signal, so as to overlay the second image over the original video image. To provide the OSD image, the OSD signal is typically injected into an amplifier circuit for the video signal while, simultaneously, the video input signal to the amplifier circuit is attenuated or "blanked". To prevent the video image from showing through the OSD image, while the OSD signal is active, coupling of the video signal to the amplifier's output signal by feed through and crosstalk must be suppressed.

In the prior art, to suppress feed through and crosstalk, a complex electronic circuit which requires a large silicon area is used. Alternatively, a dedicated pin in a video driver circuit is provided for receiving a control signal which directs whether video or OSD signal is output from the video driver circuit. These methods are unsatisfactory because of the requirements of a larger die and a dedicated pin. In addition, these methods tend to degrade bandwidth, and are particularly to difficult to implment with an 8-volt power supply.

SUMMARY OF THE INVENTION

The present invention provides, in a video amplifier circuit, an efficient on-screen display capability, which can be implemented with very few components (hence, without occupying a large silicon area), without affecting bandwidth of the video amplifier, and without affecting the switching times between an on-screen image and a video image. The present invention avoids feed through and cross-talk of the video signal into the on-screen display image by adjusting the gains of both stages of a 2-stage video amplifier.

In one embodiment, the video amplifier includes: (a) an input stage receiving a video signal and providing on an output terminal an amplified video signal; (b) an output stage, receiving the amplified video signal and an on-screen display signal, and providing (i) an output video signal at an output terminal, based on the amplified video signal, when the on-screen display signal is inactive, (ii) an output on-screen display signal, when the on-screen display signal is active, and (iii) a control signal indicating whether or not the on-screen display signal is active; and (c) an attenuation circuit receiving the control signal. The attenuation circuit of that embodiment attenuates the amplified video signal of the input stage, when the control signal indicates that the on-screen display signal is active.

In one embodiment, the attenuation circuit of the video amplifier circuit includes a transistor having an output terminal coupled to the output terminal of the input stage, and a gate terminal coupled to receive the control signal. The control signal can be generated in the output stage by a comparator coupled to receive the on-screen display signal and a reference voltage. In one embodiment, the amplified video signal of the input stage of the video amplifier is adjusted by a drive control signal and a contrast control signal.

According to another aspect of the present invention, the output stage of the video amplifier also includes an attenuation circuit which attenuates the output video signal of the output stage, when the on-screen display signal is active.

The present invention is better understood upon consideration of the detailed description below and the accompanying drawings.

DETAILED DESCRIPTION OF THE PREFERRED EMBODIMENTS

One embodiment of the present invention is provided in an improvement of a video amplifier circuit disclosed in the copending U.S. patent applications ("Copending Applications"): (a) "High Speed Video Mixer Circuit," by Ronald Page, Ser. No. 09/129,255, filed on or about the same day as the present application, and (b) "Architecture for a Video Preamplifier with an On-screen Display," Ser. No. 09/128,734, filed on or about the same day as the present application. Both Copending Applications are assigned to National Semiconductor Corporation, which is also the Assignee of the present invention. The disclosures of the Copending Applications are hereby incorporated by reference in their entirety.

Figure 1:
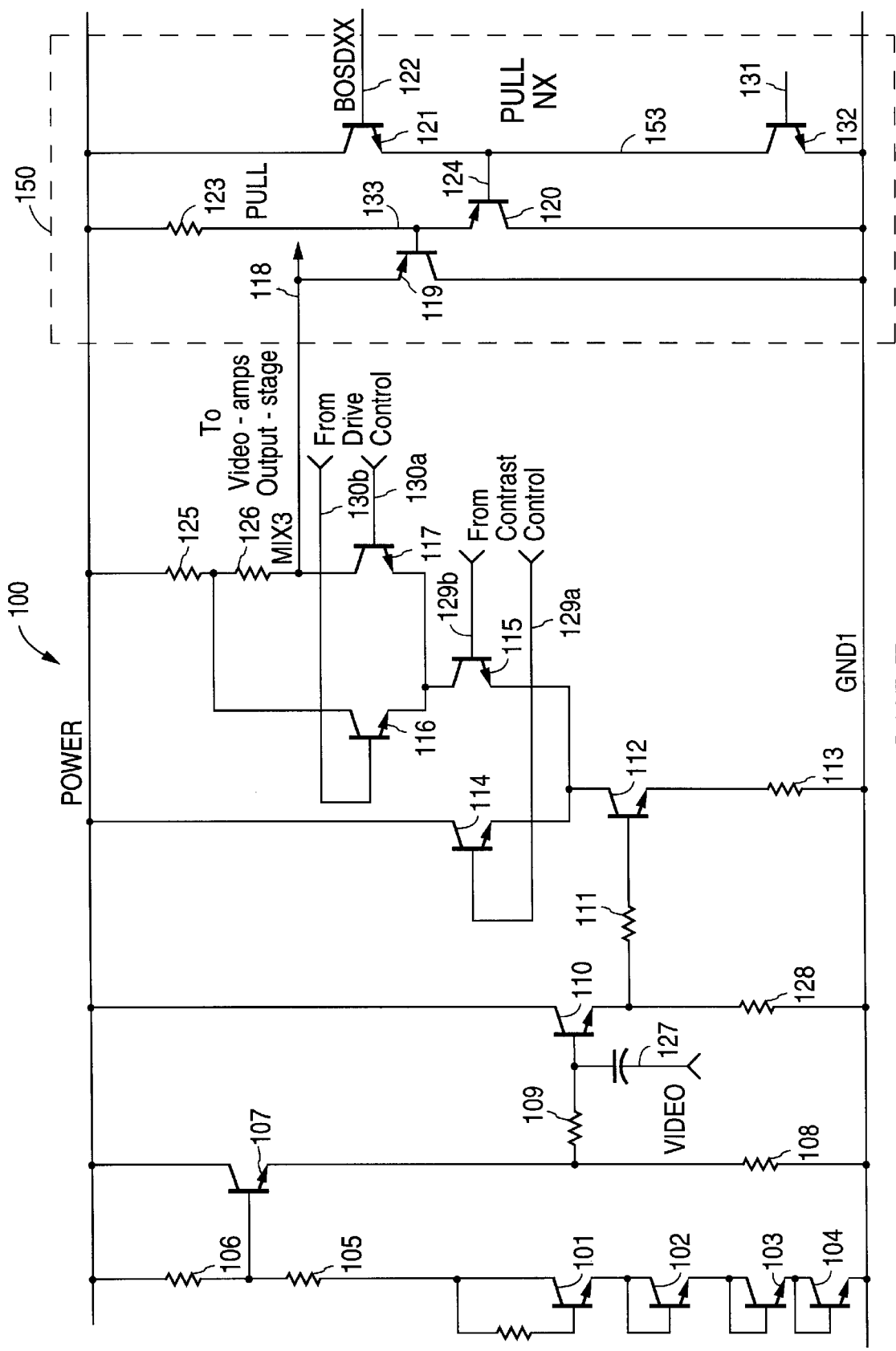
FIG. 1 shows an input stage 100 and an attenuation circuit 150 provided in a video pre-amplifier circuit, in accordance with one embodiment of the present invention.

To simplify the detailed description below, like elements in the various figures are provided like reference numerals. FIG. 1 shows an input stage 100 and an attenuation circuit 150 provided in one channel of a video pre-amplifier circuit, in accordance with one embodiment of the present invention. Typically, there are three substantially identical channels in a video amplifier circuit to provide output signals for each of the colors red, blue and green, respectively. As shown in FIG. 1, an input video signal is AC-coupled at an input terminal 127, which is a base terminal of a transistor 110 in input stage 100. Input terminal 127 is biased by a reference voltage generated by resistors 105, 106, 109 and 108, diodes 101–104, and NPN transistor 107. The video signal at input terminal 127, which modulates the collector current of NPN transistor 110, is converted into a voltage signal of a suitable DC bias by resistors 111 and 128 at the base terminal of NPN transistor 112. The voltage signal is then amplified by the action of NPN transistor 112 and resistors 113, 125 and 126 to provide an output signal at terminal 118, with adjustments by the two differential input signals $V_{contrast}$ and $V_{drive}$ received, respectively, across base terminals 129a and 129b of NPN transistors 114 and 115, and across base terminals 130a and 130b of NPN transistors 116 and 117. The differential input signal $V_{drive}$ at base terminals 130a and 130b is referred to as the "drive control" signal, and the differential input signal $V_{contrast}$ across base terminals 129a and 129b is referred to as the "contrast control" signal. When video data is active (i.e., in the absence of an on-screen display, discussed below), the gain $G_{100A}$ of the input stage 100 is proportional to voltages $V_{drive}$ and $V_{contrast}$, and the resistances $R_{1a}$, $R_{1b}$, and $R_2$ of resistors 125, 126 and 113 respectively:

$$G_{100A} = kV_{drive}V_{contrast}(R_{1b})/R_2$$

Figure 2:
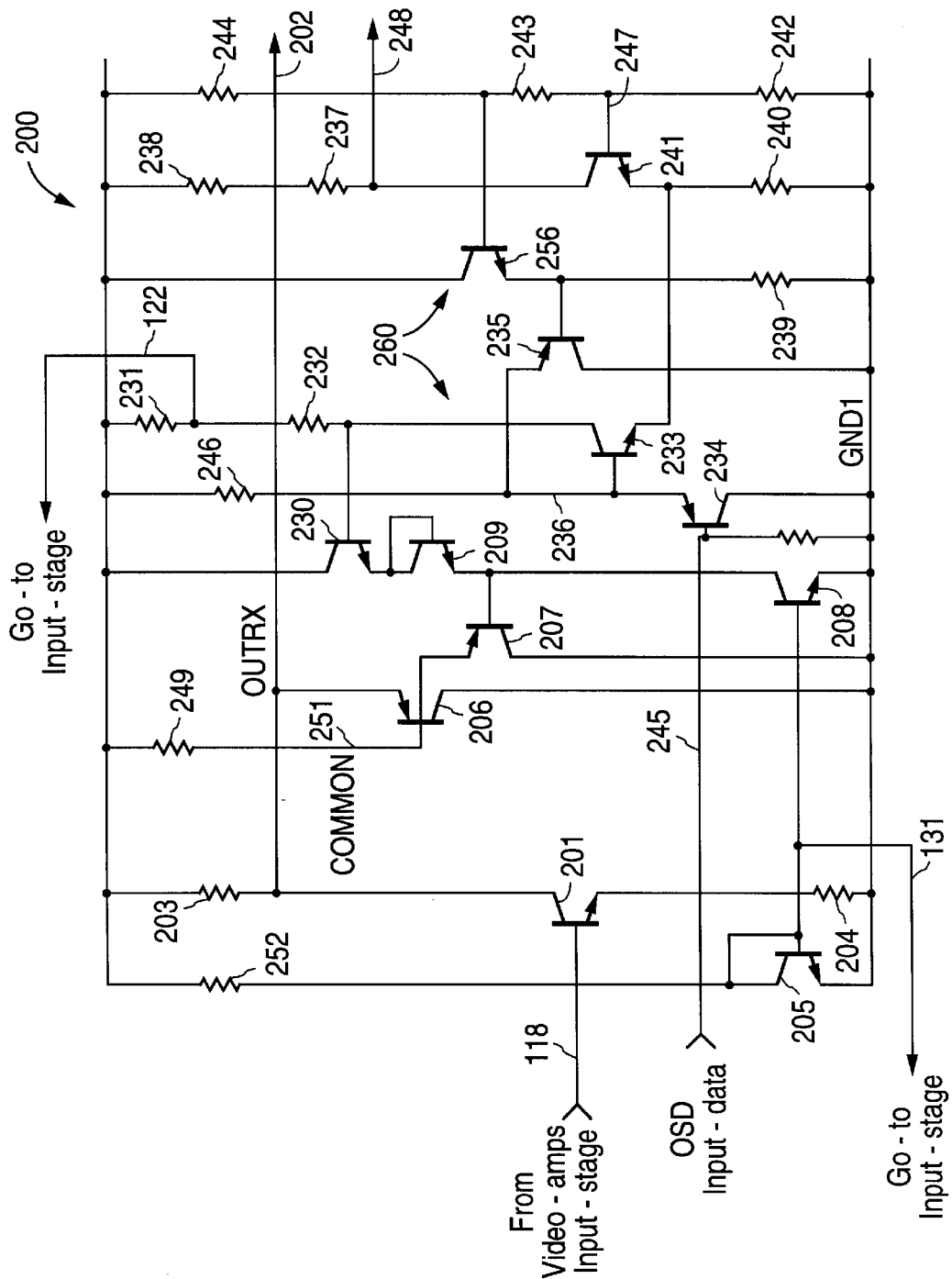
FIG. 2 shows an output stage 200 of the video pre-amplifier circuit of FIG. 1.

FIG. 1 provides exemplary resistance values 500 ohms, 1500 ohms and 2 Kohms for resistors 125, 126 and 113 respectively. The output video signal at terminal 118 is provided to an output stage 200, which is illustrated in FIG. 2. As shown in FIG. 2, the output video signal at terminal 118 is further amplified by the action of NPN transistor 201 and resistors 203 and 204 to provide an amplified output signal 202. When the video signal is active, the gain $G_{200A}$ of output stage 200 is provided by the ratio of the resistances $R_{203}$ and $R_{204}$ of resistors 203 and 204:

$$G_{200A}=R_{203}/R_{204}$$

FIG. 2 provides exemplary values of 3 Kohms and 300 ohms for resistors 203 and 204 respectively, resulting in a gain $G_{200A}$ of 10, or 20 dB. Thus, when video signal is active, the combined gain $G_A$ of input stage 100 and output stage 200 is given by:

$$G_A=G_{200A}*G_{100A}$$

When an on-screen display (OSD) is active, an OSD signal is coupled into output stage 200 at base terminal 245 of PNP transistor 234. When OSD signal is off, PNP transistor 234 acts as a level shifter, so that resistor 246 pulls the voltage $V_{236}$ at terminal 236 from ground voltage to 0.7 volts. (In this embodiment, the supply voltage is at 8 volts). When OSD signal is on, voltage $V_{236}$ is at 2.7 volts. The 2.7 volts is provided by a voltage clamp including the voltage divider formed by resistors 242, 243 and 244, and transmitted through NPN transistor 256, resistor 239 and PNP transistor 235. AS shown in FIG. 2, in this example, resistors 242, 243 and 244 are provided resistances 4 Kohms, 1.4 Kohms and 10.6 Kohms, respectively. Resistors 242, 243 and 244 also provide a reference voltage $V_{247}$ at terminal 247. In this instance $V_{247}$ is approximately 2 volts.

The voltage $V_{236}$ at terminal 236 is compared with the reference voltage $V_{247}$ at terminal 247 by comparator 260 formed by NPN transistors 233 and 241, and resistors 240, 232, 231, 237 and 238. When voltage $V_{236}$ is at 2.7 volts, comparator 260 provides an output OSD voltage at terminal 248. This output OSD voltage is mixed with the output video voltage of terminal 202 at a later stage (not shown) to drive a video display. In this embodiment, the resistances of resistors 240, 232, 231, 237 and 238 are provided as 2 Kohms, 3 Kohms, 2 Kohms, 5.9 Kohms, and 3 Kohms, respectively. When the OSD signal is active, since voltage $V_{236}$ is clamped to 2.7 volts, the voltage at the emitter terminal of NPN transistor 233 is approximately 2.0 volts. As a result, the current in resistor 240 is approximately 1 mA, and the voltage at terminal 122, common to resistors 231 and 232, drops from the supply voltage (i.e., 8 volts) to approximately 6 volts. This voltage at terminal 122 is provided as a control signal to attenuation circuit 150 of FIG. 1.

When the OSD signal is active, comparator 260 also turns on PNP transistor 207 through the action of NPN transistors 208 and 230 and diode 209. PNP transistor 207, in turn, turns on PNP transistor 206 by pulling node 251 towards the ground reference, so as to "blank" the output video signal at terminal 202. Resistor 249 is shared by all 3 color channels, so that an active OSD signal in any one of the 3 color channels would blank the output video signal of all 3 color channels. A current mirror formed by resistor 252 and NPN transistor 205 provided a reference voltage $V_{ref}$ at terminal 131. Voltage $V_{ref}$ is also provided as a reference voltage to attenuation circuit 150 of FIG. 1.

When the OSD signal is active, the gain of output stage 200 is reduced because of the low on-impedance $X_{206}$ of transistor 206. The gain $G_{200D}$ of output stage 200 is given by:

$$G_{200D}=(R_{203}\|X_{206})/R_{204}$$

Without attenuation circuit 150, the video signal at input terminal 118 can still feed through to output terminal 202, even when transistor 206 is turned on. Further reduction of the impedance $X_{206}$ of PNP transistor 206 can be achieved by, for example, increasing the size (hence, the current) of transistor 206. However, increasing the current in transistor 206 also increases the switching time of transistor 206 from OSD active to video active conditions. The increased switching time may result in creating a black right edge to an OSD image and may reduce the bandwidth of the video pre-amplifier. Attenuation circuit 150 obviates the need for further increasing the size of transistor 206.

Referring back to FIG. 1, terminal 122 is coupled to the base terminal of NPN transistor 121 so that, when the OSD signal is active, the voltage at the emitter terminal 153 drops from approximately 7.3 volts to 5.3 volts. (The reference voltage at terminal 131 ensures that NPN transistors 121 and 132 are always on) Consequently, PNP transistor 120 turns on by the voltage on terminal 124, which is common to emitter terminal of transistor 121 and the collector terminal of transistor 132, when the OSD signal is active, thereby pulling emitter terminal 133 of PNP transistor 120 towards the ground reference, and turning on PNP transistor 119. Terminal 133 is pulled to the supply voltage by resistor 123, when the OSD signal is inactive. PNP transistor 119 pulls the output terminal 118 of input stage 100 towards ground reference. Consequently, the lower on-impedance $X_{119}$ of PNP transistor 119 reduces the gain $G_{100D}$ of input stage 100. Gain $G_{100D}$ is given by:

$$G_{100D}=kV_{drive}V_{contrast}(R_{1b}\|X_{119})/R_2$$

The combined gain of input stage 100 and output stage 200 is thus given by:

$$G_D=G_{100D}*G_{100D}$$

Since the "OSD signal active" gains $G_{100D}$ and $G_{200D}$ are substantially smaller than the corresponding "video signal active gains" $G_{100A}$ and $G_{200A}$, respectively, effective blanking of video signal is achieved. A simulation of the attenuation of video signal at terminal 202 shows that, without attenuation circuit 150, the video signal at terminal 202 is attenuated by −31 dB, when the OSD image is white, and attenuated by −14 dB, when the OSD image is black. With attenuation circuit 150, the video signal at terminal 202 is attenuated by −44 dB, when the OSD image is white, and attenuated by −42 dB, when the OSD image is black. Thus, significant improvement in video signal attenuation during an active OSD signal is demonstrated. It is also shown that the effect of attenuation circuit 150 on the rise and fall times of the video signal, when switching between a video active condition to an OSD active condition, is negligible.

The above detailed description is provided to illustrate specific embodiments of the present invention and is not intended to be limiting. Numerous variations and modifications within the scope of the present invention is possible. The present invention is set forth in the following claims.

I claim:

1. A video amplifier circuit with on-screen display, comprising:

an input stage receiving a video signal, and providing on an output terminal an amplified video signal;

an output stage receiving said amplified video signal and an on-screen display signal, said output stage providing (a) an output video signal at an output terminal, based on said amplified video signal, when said on-screen display signal is inactive, (b) an output on-screen display signal, when said on-screen display signal is active, and (c) a control signal indicating whether or not said on-screen display signal is active; and an attenuation circuit receiving said control signal, said attenuation circuit attenuating said amplified video signal, when said control signal indicates that said on-screen display signal is active.

2. A video amplifier circuit as in claim 1, wherein said attenuation circuit comprises a transistor having an output terminal coupled to said output terminal of said input stage, and a gate terminal coupled to receive said control signal.

3. A video amplifier circuit as in claim 1, wherein said control signal is generated in said output stage by a comparator coupled to receive said on-screen display signal and a reference voltage.

4. A video amplifier circuit as in claim 1, wherein the gain of said input stage is adjusted by a drive control signal.

5. A video amplifier circuit as in claim 1, wherein the gain of said input stage is adjusted by a contrast control signal.

6. A video amplifier circuit as in claim 1, further comprising a second attenuation circuit, said second attenuation circuit attenuating said output video signal of said output stage, when said on-screen display signal is active.

7. A video amplifier circuit as in claim 6, further comprising:

a comparator coupled to receive said on-screen display signal and a reference voltage to provide said control signal; and a transistor having an output terminal coupled to said output terminal of said output stage and a gate terminal coupled to receive said control signal.

8. A method for providing an on-screen display, comprising:

in an input stage, receiving a video signal, and providing, on an output terminal of said input stage, an amplified video signal;

in an output stage, receiving said amplified video signal and an on-screen display signal, and providing (a) based on said amplified video signal, an output video signal at an output terminal, when said on-screen display signal is inactive, (b) an output on-screen display signal, when said on-screen display signal is active, and (c) a control signal indicating whether or not said on-screen display signal is active; and in an attenuation circuit, receiving said control signal and attenuating said amplified video signal, when said control signal indicates that said on-screen display signal is active.

9. A method as in claim 8, wherein said attenuating is achieved by providing a transistor having an output terminal coupled to said output terminal of said input stage, and a gate terminal coupled to receive said control signal.

10. A method as in claim 8, wherein said control signal is generated in said output stage by a comparator coupled to receive said on-screen display signal and a reference voltage.

11. A method as in claim 8, further comprising adjusting the gain of said input stage by a drive control signal.

12. A method as in claim 8, further comprising adjusting the gain of said input stage by a contrast control signal.

13. A method as in claim 8, further comprising attenuating said output video signal of said output stage, when said on-screen display signal is active.

14. A method as in claim 13, further comprising:

coupling said on-screen display signal and a reference voltage to a comparator to provide said control signal; and providing a transistor having an output terminal coupled to said output terminal of said output stage and a gate terminal coupled to receive said control signal.

* * * * *